May 7, 1957  L. M. FORBUSH  2,791,297
MULTIPLE SHOE TYPE EXPANDING BRAKE
Filed April 28, 1954  4 Sheets-Sheet 1

INVENTOR.
Lothrop M. Forbush
BY
Craig V. Morton
His Attorney

May 7, 1957 L. M. FORBUSH 2,791,297
MULTIPLE SHOE TYPE EXPANDING BRAKE
Filed April 28, 1954 4 Sheets-Sheet 3

INVENTOR.
Lothrop M. Forbush
BY
Craig V. Morton
His Attorney

May 7, 1957  L. M. FORBUSH  2,791,297
MULTIPLE SHOE TYPE EXPANDING BRAKE
Filed April 28, 1954  4 Sheets-Sheet 4
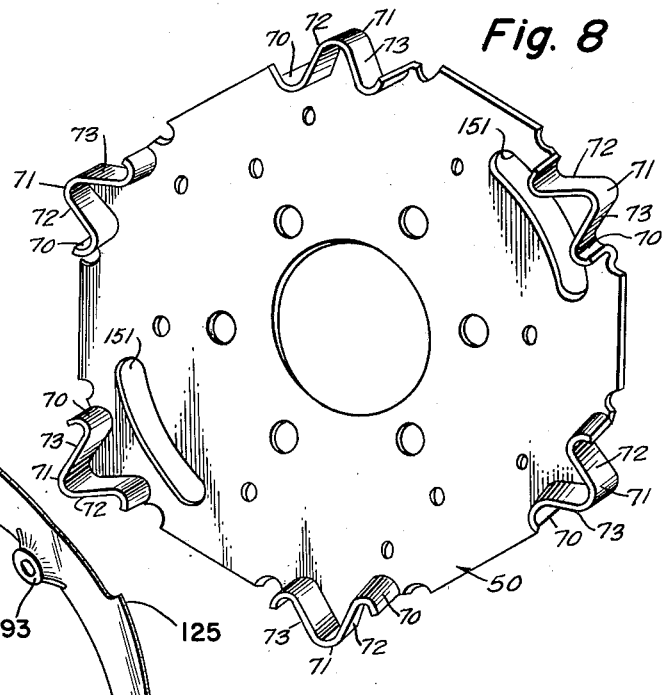
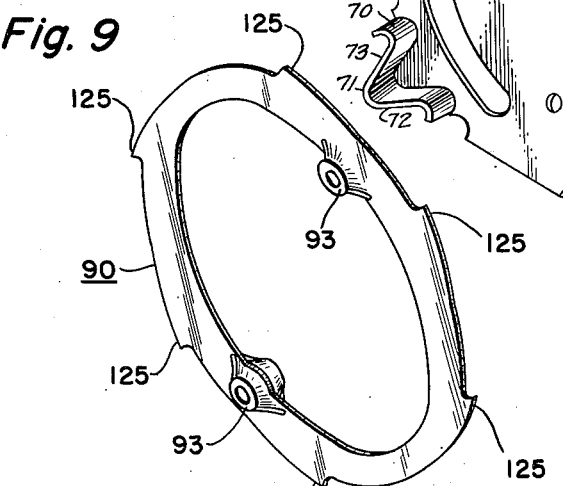
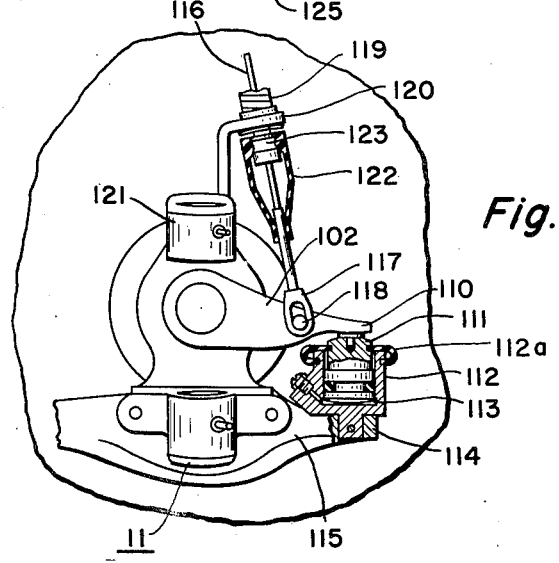
INVENTOR.
Lothrop M. Forbush
BY
Craig V. Morton
His Attorney United States Patent Office 2,791,297
Patented May 7, 1957

2,791,297

MULTIPLE SHOE TYPE EXPANDING BRAKE

Lothrop M. Forbush, Ferndale, Mich., assignor to General Motors Corporation, Detroit, Mich., a corporation of Delaware Application April 28, 1954, Serial No. 426,142

6 Claims. (Cl. 188—78)

This invention relates to a brake structure of an enclosed type. An object of the invention is to provide a brake structure utilizing a plurality of independently acting brake shoes or brake pads to obtain uniform braking action around the periphery of a brake drum associated with the brake structure.

Another object of the invention is to provide a brake structure that includes a multiplicity of independently acting friction pads that separately engage a brake drum associated with the brake structure in a manner that wear on the friction pads is distributed between the several friction pads during each braking operation whereby all of the friction pads uniformly engage the brake drum associated with the brake structure.

It is another object of the invention to provide a brake structure in accordance with the foregoing object wherein each of the friction pads of the brake structure is actuated mechanically, the wear on the friction pads being such as to effect uniform brake action by each of the pads when mechanically moved into engagement with the brake drum cooperating with the brake structure.

It is another object of the invention to provide a brake structure for an automotive vehicle that includes a multiplicity of independently acting friction pads that are retained between angularly disposed reaction surfaces in a manner that each of the friction pads is self-energized during the braking operation, the pads being mechanically actuated by a cam structure.

Another object of the invention is to provide a brake structure having a multiplicity of independently actuated friction pads that are moved radially outwardly into engagement with the brake drum by means of a cam actuated lever system to obtain brake action and wherein each of the friction pads cooperates with reaction surfaces to obtain self-energization during a braking operation.

Further objects and advantages of the present invention will be apparent from the following description, reference being had to the accompanying drawings wherein a preferred form of the invention is clearly shown.

In the drawings:

Figure 8 is a perspective elevational view of one of the reaction plates for the brake structure.

Figure 9 is a perspective elevational view of the cam actuating ring for the brake structure.

Figure 10 is an elevational view, partially in cross section, illustrating the hydraulic and mechanical actuating device for the brake structure.

Figure 1:
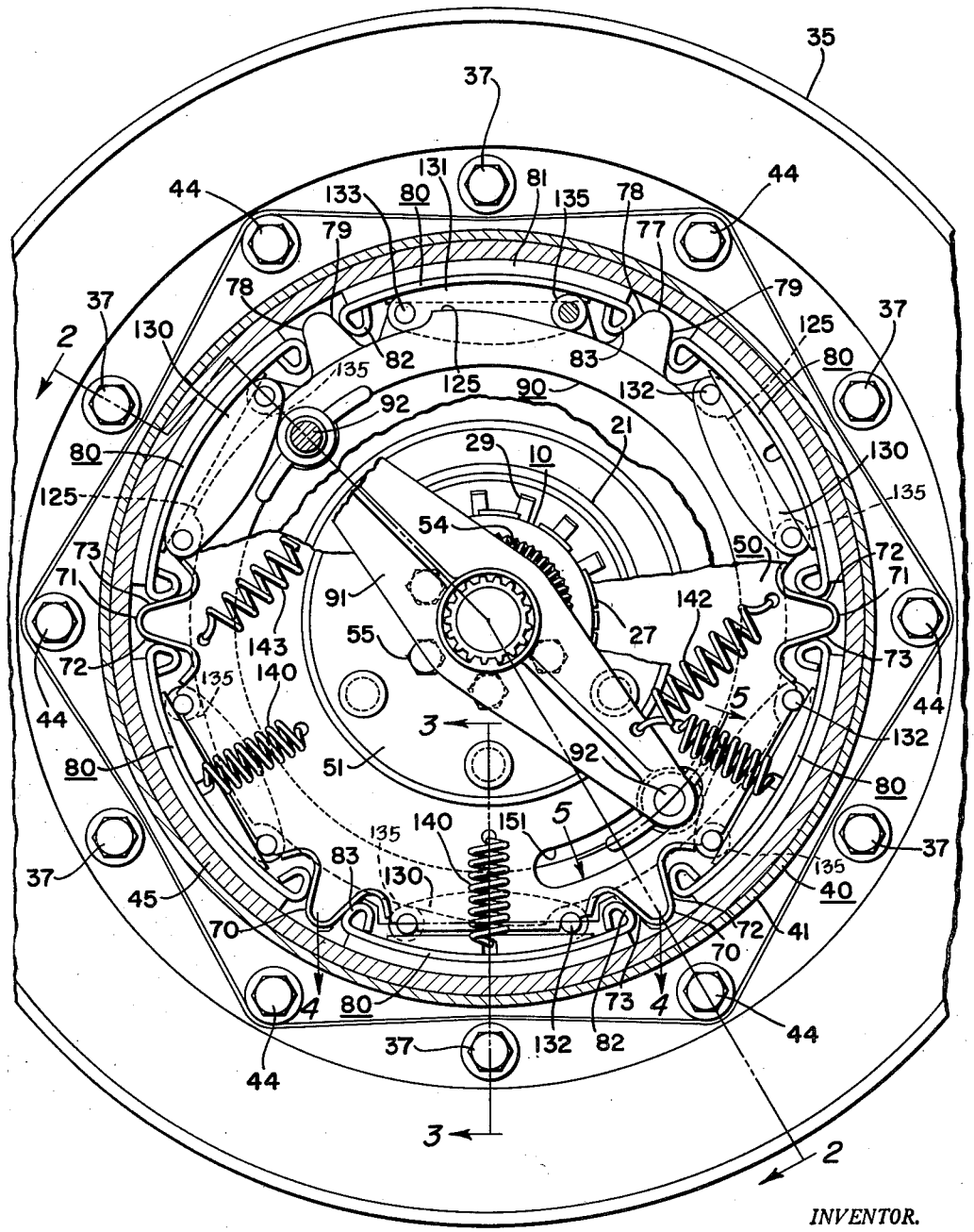
Figure 1 is an end view of a brake structure incorporating features of this invention and is a cross section taken along line 1—1 of Figure 2.

In this invention the brake structure is illustrated in use in cooperation with a front wheel of a motor vehicle. However, the use of the brake is not so limited, as obviously it can be used in cooperation with the rear wheel of a motor vehicle.

The mounting structure for the front wheel of a motor vehicle comprises an axle 10 that projects horizontally from one side of the kingpin bearing mounting 11. The kingpin bearing mounting is supported from the frame of the motor vehicle on a kingpin in conventional manner.

The axle 10 supports a pair of anti-friction bearings 12 and 13 that comprise the inner bearing races 14 and 15 respectively supported on the periphery of the axle 10 and the outer bearing races 16 and 17 that support the wheel disk 18, suitable ball bearings 19 and 20 being provided between the inner and outer races of the bearing structure.

The outer bearing races 16 and 17 are positioned within the hub 21 of the wheel disk 18 from which the wheel disk portion 22 radiates.

The bearing 13 has a grease seal 23 positioned on the inboard side of the hub 21 of the wheel disk. Similarly, the wheel bearing 12 has a grease seal 24 positioned on the outboard side of the wheel hub 21. An annular shield 25 is supported on the axle 10 and positioned between the shoulder 26 thereon and the inner bearing race 15. The shield 25 closes the inboard end of the wheel hub 21 to minimize the access of dirt to the grease seal 23.

The wheel bearings 12 and 13 are retained in position on the axle 10 by means of a nut 27 received upon the threaded end 28 of the axle. The nut 27 engages a washer 29 that in turn engages the inner bearing race 14 of the anti-friction bearing 12. The anti-friction bearing 12 engages the radial shoulder 30 in the wheel hub 21 and the anti-friction bearing 13 engages a corresponding radial shoulder 31. When the nut 27 is threaded upon the threaded end portion 28 of the axle 10, the anti-friction bearing 12 is urged against the radial shoulder 30 and thereby urges the hub 21 to the right, as viewed in Fig. 2, to cause the radial shoulder 31 to urge the anti-friction bearing 13 to the right until its inner race 15 is stopped by the shield 25 which engages the shoulder 26 on the axle 10. The wheel disk 18 is thus retained on the axle 10.

The wheel rim 35 is demountably secured to the wheel disk 22 by means of wheel studs 36 and wheel lugs 37.

A brake drum 40 having the cylindrical side wall 41 and the radial closure wall 42 is demountably secured to the wheel disk portion 22 by means of the studs 43 and lugs 44. The drum 40 carries a cylindrical reinforcing member 45 bonded to the cylindrical wall 41 of the drum. The member 45 has a shouldered portion 46 that engages a shoulder 47 near the periphery of the wheel disk 18 whereby to centralize the drum 40 on the wheel disk relative the axle 10.

Figure 3:
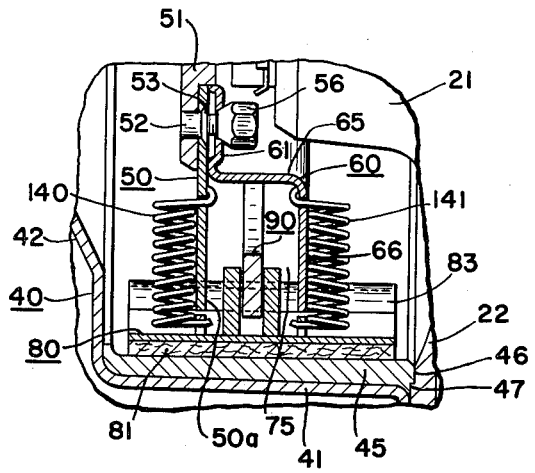
Figure 3 is a cross sectional view of the brake structure taken along line 3—3 of Figure 1.
Figure 5:
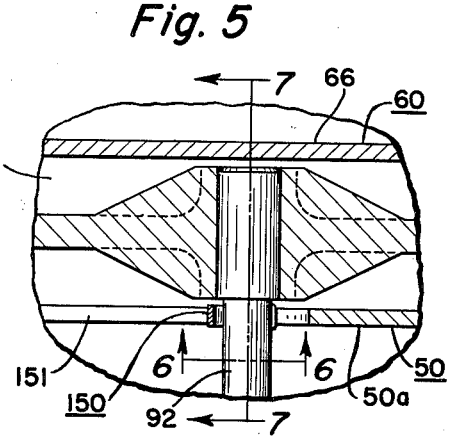
Figure 5 is a cross sectional view taken along line 5—5 of Figure 1.

The actuating structure of the brake positioned within the brake drum 40 comprises a first reaction plate 50 in the form of a disk that is secured to the mounting ring 51 by means of a plurality of studs 52, see Fig. 3, retained in the mounting ring 51. The retaining studs 52 have a radially flanged portion 53 that secures the reaction plate 50 to the mounting ring 51. The mounting ring 51 has a radially serrated surface 59 that cooperates with the radially serrated end 54 of the axle 10 to prevent rotation of the mounting plate 51 relative to the axle 10. Bolts 55 secure the mounting plate to the axle 10.

A second reaction plate 60 has an inner radially disposed portion 61 that engages the central portion of the reaction plate 50 and is retained thereagainst by means of the nuts 56 threaded on the end of the studs 52 that pass through openings in the central portion 61 of the second reaction plate 60. The reaction plate 60 includes an annular cylindrical portion 65 that terminates in a second radial portion 66. The radial portion 66 of the reaction plate 60 is disposed in spaced relationship to that portion of the reaction plate 50 that extends outwardly beyond the engagement of the annular portion 65 of the plate 60. The outer portion 50a of the reaction plate 50 is parallel to the outer portion 66 of the reaction plate 60 thereby creating an annular space between the reaction plate portions 50a and 66.

Figure 2:
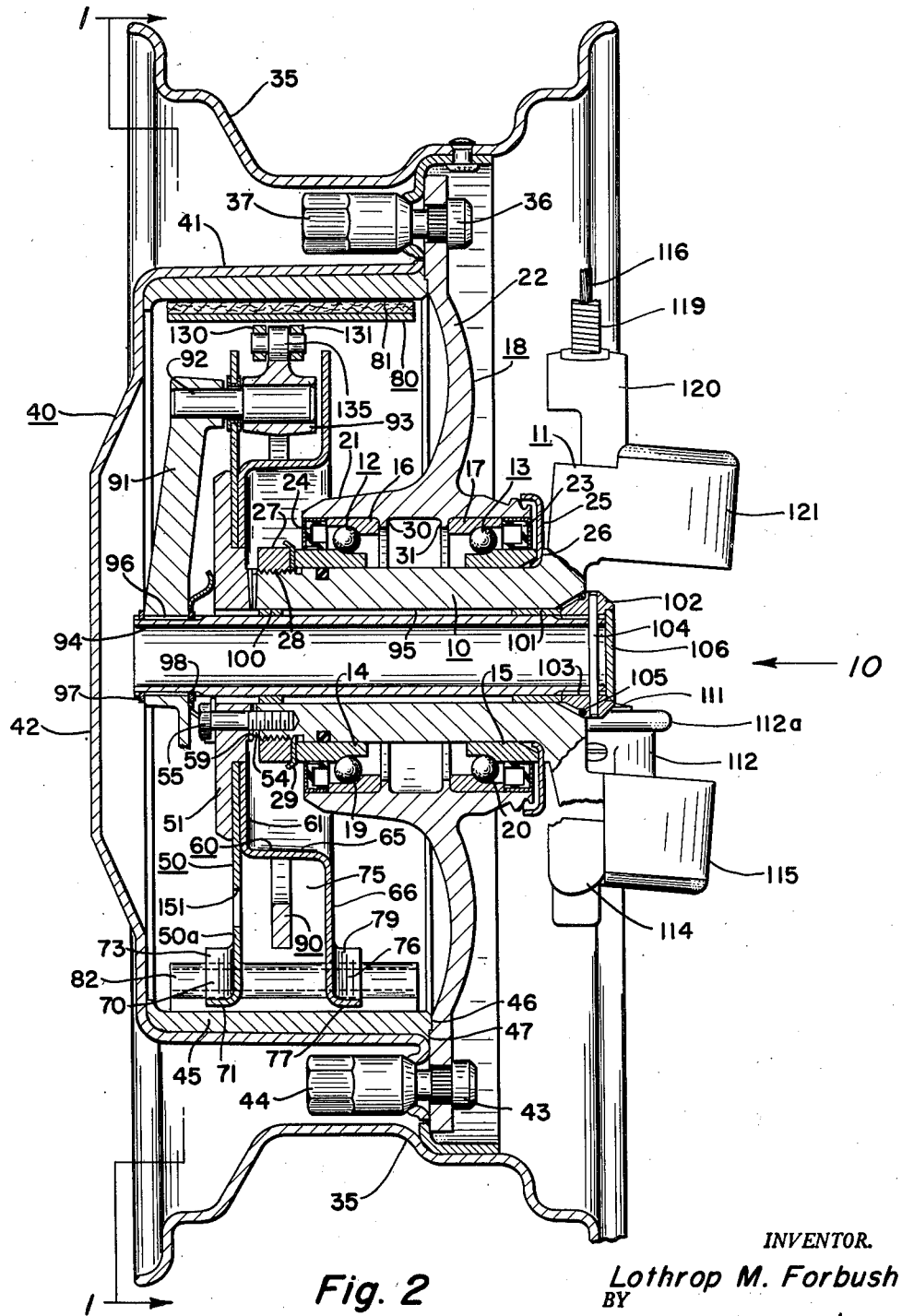
Figure 2 is a transverse cross sectional view of the brake structure taken along the line 2—2 of Fig. 1.

The reaction plate 50 is more specifically illustrated in Fig. 8. The outer peripheral edge of the reaction plate 50 has flanged portions 70 that are generally parallel with the axis of the reaction plate 50. Each of the flanged portions 70 includes a radially projecting portion 71 that extends outwardly of the surface of the flanged portion 70 and is provided with angular faces 72 and 73 that provide cam surfaces or reaction surfaces to effect operation of the brake shoes in a manner hereinafter described. The reaction plate 60 has its outer peripheral edge formed to the same configuration with the outer peripheral surface of the reaction plate 50. As illustrated in Figure 2, the flanged portion 70 of the reaction plate 50 projects axially of the plate 50 out from the face thereof outside the space 75 between the plates 50 and 60. Similarly, the flanged portions 76 of the reaction plate 66 project outwardly from the face of the reaction plate 60 outside the space 75. The space 75 between the reaction plates 50 and 60 is thus clear to receive brake shoes and actuating elements in a manner hereinafter described.

The projections 71 on the reaction plate 50 are axially aligned with the projections 77 on the reaction plate 60. Also the reaction surfaces 72 and 73 on the projections 71 of the reaction plate 50 are axially aligned with reaction surfaces 78 and 79 on the projection 77 on the reaction plate 60, and are in parallel relation therewith.

Between each adjacent pair of projections 71 of the reaction plate 50 and 77 of the reaction plate 60 there is positioned a brake shoe 80. The brake shoe 80 comprises a metal rim that is a segment of a circle, each brake shoe carrying a friction element or brake lining 81. Each of the brake shoes 80 has opposite ends thereof formed with enlarged ends 82 and 83. The enlarged end 82 engages the reaction surfaces 73 and 79 of the projections 71 and 77 respectively while the enlarged end 83 of the brake shoe 80 engages the reaction surfaces 72 and 78 of the projections 71 and 77 respectively.

Each of the brake shoes 80, or brake shoe segments, acts independently of the other brake shoe segments of the brake structure. Since each of the brake shoes 80 is a relatively short segment, uniformity of engagement of the friction linings 81 with the brake drum 40 is occasioned, the plurality of brake shoe segments effecting more conformity to the contour of the brake drum than is effected by a brake shoe segment of substantially greater length.

The brake shoe segments 80 are actuated by means of a cam ring 90 positioned within the space 75 between the reaction plates 50 and 60. The cam ring 90 is supported at opposite ends of an actuating arm 91. The arm 91 carries the pins 92 that extend into bearing bosses 93 provided on the actuating ring 90.

The actuating arm 91 is supported upon a hollow shaft 94 that extends through the axle bore 95 in the axle 10. A spline connection 96 is provided between the actuating arm 91 and the outboard end of the shaft 94, the snap rings 97 and 98 retaining the actuating arm 91 axially positioned on the shaft 94.

The shaft 94 is journaled in the bore 95 in the axle 10 on annular bearing rings 100 and 101. The inboard end of the shaft 94 carries a lever 102 on a spline connection 103 to prevent rotation between the lever and the shaft 94. A pin 104 retains the lever 102 on the shaft 94. An O ring seal 105 is placed between the lever 102 and the inboard end of the axle 10 to prevent entry of dirt around the hollow shaft 94. The hollow shaft 94 has the inboard end closed with a closure plate 106.

The lever 102 has the free end 110 thereof engaging an actuating piston 111 projecting from a hydraulic cylinder 112 and has the internal bore supplied with fluid under pressure from the master cylinder of a hydraulic brake system of any conventional type. The cylinder 112 is supported upon the arm 114 that is integral with the lower half 115 of the kingpin bearing support. The cylinder 112 thus forms the conventional wheel cylinder for operation of the brake, but is disposed outside of the brake drum rather than internally as in conventional constructions, whereby the cylinder and fluid therein are outside the influence of the heat created by braking action. The upper end of the actuating piston of the wheel cylinder 112 has a flexible rubber-like boot 112a closing the open end of the cylinder 112.

A manually actuated cable 116 is also connected to the lever 110 through an eye 117 and a pin 118. The cable 116 is of the Bowden wire type in which the enclosing casing 119 has the one end thereof fixedly mounted on the bracket 120 carried upon the upper portion 121 of the kingpin bearing. A rubber-like boot 122 extends between the end 123 of the casing 119 of the Bowden wire cable and the end of the casing 116 to prevent entry of dirt into the cable housing.

Figure 4:
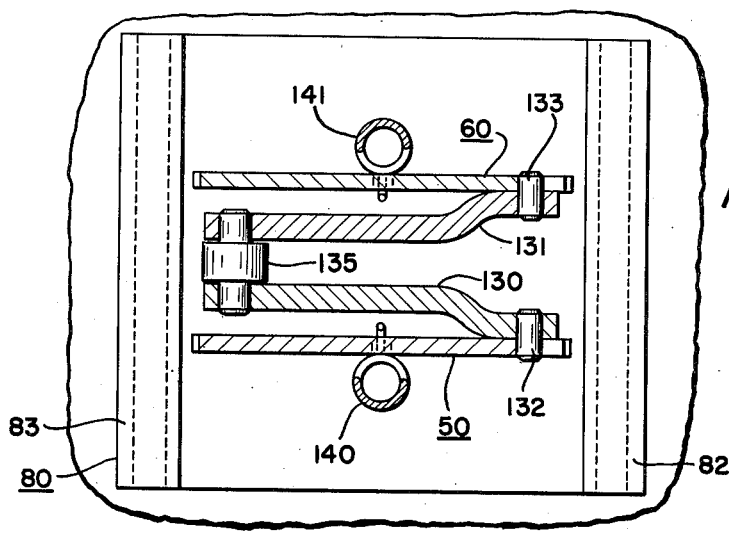
Figure 4 is a cross sectional view of the brake structure taken along line 4—4 of Figure 1.

The actuating ring 90 of the brake structure has a plurality of cam surfaces 125. Between the cam ring 90 and each of the brake shoe segments 80 there is provided a pair of links 130 and 131. Each of the links has one end thereof pivotally supported upon the reaction plates 50 and 60 respectively by means of pins 132 and 133, see Fig. 4. Between the opposite ends of the links 130 and 131 there is provided a roller 135 suitably journaled in the links 130 and 131 as shown in Fig. 4. Each of the rollers 135 engage one of the reaction surfaces 125 on the periphery of the cam ring 90, as shown in Fig. 1.

Thus, when the cam ring 90 is rotated in a clockwise direction, as viewed in Fig. 1, the rise of the cam surface 125 causes the roller 135 to move the right-hand end of the brake shoe 80 into engagement with the brake drum 40. With the brake drum 40 rotating in a counterclockwise direction, the brake shoe has the end 82 thereof urged against the reaction surfaces 73 and 79 of the projections 71 and 77 respectively which causes the brake shoe to rise on the reaction surface and secure servo action in the application of the brake.

Each of the brake shoes 80 is drawn radially inwardly out of engagement with the brake drum 40 by means of the tension springs 140 and 141, a pair of tension springs being provided for each of the multiplicity of the brake shoes 80 provided around the periphery of the brake drum. The actuating arm 91 is retained in a normal brake release position by means of the retraction springs 142 and 143 connected between the arm 91 and the reaction plate 50.

From the foregoing description it will be apparent that vertical movement of the piston 111 in the cylinder 112 caused by introduction of hydraulic fluid under pressure into the cylinder 112 from the master cylinder of a hydraulic brake system will cause counterclockwise movement of the lever 102, as viewed in Fig. 10. This counterclockwise movement of the lever 102 will effect a clockwise movement of the arm 91 as viewed in Fig. 1 to rotate the cam ring 90 and through it and the rollers 135 move the brake shoe segments 80 into engagement with the brake 40 that is rotating in a counterclockwise direction. As soon as the leading end of the brake shoe segment 80 engages the inner periphery of the brake drum as urged by the roller 135, the brake shoe segment 80 will attempt to rotate counterclockwise with the brake drum 40. However, the brake shoe segment 80 is prevented from this counterclockwise rotation by engagement of the enlarged end 82 thereof with the reaction surfaces 73 and 79 on the reaction plates 50 and 60 respectively. Since the reaction surfaces are inclined relative to the true radius of the reaction plates, the brake shoe will tend to rise against the brake drum and thereby effect a self-energization of the brake shoe to aid in the brake action of the brake structure.

Figures 6, 7:
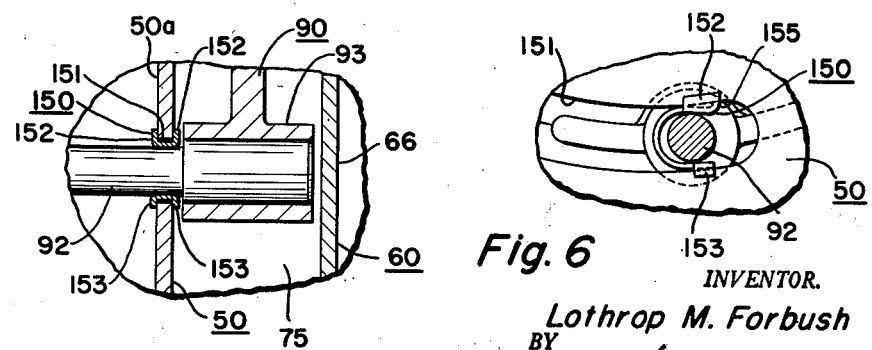
Figure 6 is a cross sectional view of the large adjusting mechanism for the brake structure taken along line 6—6 of Figure 5.
Figure 7 is a cross sectional view of the large adjusting mechanism taken along line 7—7 of Figure 5.

To provide for maintaining substantially constant clearance between the friction surfaces of the brake shoes 80 and the brake drum 40 with the shoes in the "off" or retracted position an automatic lash adjustor more specifically illustrated in Figs. 6 and 7 is provided between the actuating arm 91 and the reaction plate 50. Between each of the pins 92 and the reaction plate 50 there is provided a lash adjustor 150, see Fig. 6. The lash adjustor 150 comprises a substantially U-shaped member that is slidably supported in a slot 151 in the reaction plate 50 as retained by ears 152 and 153 on opposite sides of the reaction plate 50 at opposite ends of the U-shaped member 150. One end 155 of the U-shaped lash adjustor 150 is formed angular to the leg of the U-shaped member of which it is a continuation. The pin 92 extending from the arm 91 is of a diameter greater than a dimension between the inner faces of the U-shaped member 150 at their open end and whereas the bight of the U-shaped member is of a diameter at least equal to the diameter of the pin 92.

Thus as illustrated in Fig. 6, the pin 92 cannot move outwardly through the open end of the U-shaped member when it is in position in the slot 151 in the reaction plate 50. However, the pin 92 can move into the bight of the U-shaped member freely.

When the brake is applied, the first movement of the pins 92 is from the position illustrated in Fig. 6 to a position engaging the bight of the U-shaped member. This movement is sufficient to establish the normal working clearances between the friction surfaces of the friction elements of the brake shoes and the interior surface of the brake drum.

As the friction elements of the brake shoes tend to wear, the U-shaped lash adjustor 150 will be moved by the pins 92 in a leftward direction, as viewed in Fig. 6 during the normal brake operation. However, the actuating arm 91 can retract only the amount of movement allowed within the U-shaped adjustor 150, as shown in Fig. 6. When this movement occurs the end 155 of the lash adjustor digs into the edge of the slot 151 and is forcefully held against the edge of the slot by the pin 92 as urged in a rightward direction by the retraction springs 142 and 153. Thus as the friction elements of the brake shoes wear, there will be maintained an automatic adjustment of the position of the friction shoes relative to the surface of the brake drum.

While the form of embodiment of the invention as herein disclosed constitutes a preferred form, it is to be understood that other forms might be adopted as may come within the scope of the claims which follow.

What is claimed is as follows:

1. In a brake mechanism for a vehicle, the combination with a vehicle wheel and a fixed support for the wheel, of a brake drum carried on the wheel, a reaction member within said drum intermediate opposite sides thereof having axially spaced annular peripheral portions, means fixedly mounting said reaction member on said fixed support, said peripheral portions each having a plurality of peripherally spaced and axially aligned radially outwardly extending projections, adjacent peripherally spaced and axially aligned projections providing cooperating pairs, said cooperating pairs having peripherally facing reaction surfaces disposed angularly relatively on an outwardly increasing angle, an arcuately shaped brake shoe positioned between each of said cooperating pairs of projections with opposite ends of the shoe engaging facing reaction surfaces and opposite longitudinal edges of the shoes disposed axially beyond said spaced peripheral portions of said reaction member whereby said shoes overlay said reaction member, retraction spring means between each of said shoes and said reaction member normally retaining said shoes in engagement with cooperating facing reaction surfaces, an actuating ring positioned between said annular peripheral portions for oscillation on its axis and having a peripheral cam surface adjacent each of said brake shoes to effect radial movement of the shoe into engagement with said drum, anti-friction means disposed between each of said shoes and the cam surface thereadjacent on said actuating ring to effect transfer of cam movement to said shoes, and a manually actuated arm carried on said fixed support for oscillation and including means connecting said arm with said actuating ring to effect oscillation thereof to actuate said brake shoes.

2. In a brake mechanism for a vehicle, the combination with a vehicle wheel and a fixed support for the wheel, of a brake drum carried on the wheel, a reaction member within said drum intermediate opposite sides thereof having axially spaced annular peripheral portions, means fixedly mounting said reaction member on said fixed support, said peripheral portions each having a plurality of peripherally spaced and axially aligned radially outwardly extending projections, adjacent peripherally spaced and axially aligned projections providing cooperating pairs, said cooperating pairs having peripherally facing reaction surfaces disposed angularly relatively on an outwardly increasing angle, an arcuately shaped brake shoe positioned between each of said cooperating pairs of projections with opposite ends of the shoe engaging facing reaction surfaces and opposite longitudinal edges of the shoes disposed axially beyond said spaced peripheral portions of said reaction member whereby said shoes overlay said reaction member, retraction spring means between each of said shoes and said reaction member normally retaining said shoes in engagement with cooperating facing reaction surfaces, an actuating ring positioned between said annular peripheral portions for oscillation on its axis and having a peripheral cam surface adjacent each of said brake shoes to effect radial movement of the shoe into engagement with said drum, link means adjacent each of said shoes and disposed at each of opposite sides of said actuating ring and adjacent the said annular peripheral portions of said reaction member, said link means each having one end pivotally mounted on the said annular peripheral portion thereadjacent, opposite ends of said link means being interconnected and supporting an anti-friction means disposed between each of said shoes and the cam surface thereadjacent on said actuating ring to effect transfer of cam movement to said shoes, and a manually actuated arm carried on said fixed support for oscillation and including means connecting said arm with said actuating ring to effect oscillation thereof to actuate said brake shoes.

3. In a brake mechanism for a vehicle, the combination with a vehicle wheel and a fixed support for the wheel, of a brake drum carried on the wheel, a reaction member within said drum intermediate opposite sides thereof having axially spaced annular peripheral portions, means fixedly mounting said reaction member on said fixed support, said peripheral portions each having a plurality of peripherally spaced and axially aligned radially outwardly extending projections, adjacent peripherally spaced and axially aligned projections providing cooperating pairs, said cooperating pairs having peripherally facing reaction surfaces disposed angularly relatively on an outwardly increasing angle, an arcuately shaped brake shoe positioned between each of said cooperating pairs of projections with opposite ends of the shoe engaging facing reaction surfaces and opposite longitudinal edges of the shoes disposed axially beyond said spaced peripheral portions of said reaction member whereby said shoes overlay said reaction member, retraction spring means between each of said shoes and said reaction member normally retaining said shoes in engagement with cooperating facing reaction surfaces, an actuating ring positioned between said annular peripheral portions for oscillation on its axis and having a peripheral cam surface adjacent each of said brake shoes to effect radial movement of the shoe into engagement with said drum, anti-friction means disposed between each of said shoes and the cam surface thereadjacent on said actuating ring to effect transfer of cam movement to said shoes, and a manually actuated member carried on said fixed support for oscillation on its axis, said member comprising a plurality of radially extending arms, the ends of said arms having means connecting the same to said actuating ring to support the same between said peripheral portions and effect oscillation of the ring to actuate said brake shoes.

4. In a brake mechanism for a vehicle, the combination with a vehicle wheel and a fixed support for the wheel, of a brake drum carried on the wheel, a reaction member within said drum intermediate opposite sides thereof having axially spaced annular peripheral portions, means fixedly mounting said reaction member on said fixed support, said peripheral portions each having a plurality of peripherally spaced and axially aligned radially outwardly extending projections, adjacent peripherally spaced and axially aligned projections providing cooperating pairs, said cooperating pairs having peripherally facing reaction surfaces disposed angularly relatively on an outwardly increasing angle, an arcuately shaped brake shoe positioned between each of said cooperating pairs of projections with opposite ends of the shoe engaging facing reaction surfaces and opposite longitudinal edges of the shoes disposed axially beyond said spaced peripheral portions of said reaction member whereby said shoes overlay said reaction member, retraction spring means between each of said shoes and said reaction member normally retaining said shoes in engagement with cooperating facing reaction surfaces, an actuating ring positioned between said annular peripheral portions for oscillation on its axis and having a peripheral cam surface adjacent each of said brake shoes to effect radial movement of the shoe into engagement with said drum, anti-friction means disposed between each of said shoes and the cam surface thereadjacent on said actuating ring to effect transfer of cam movement to said shoes, and a manually actuated member carried on said fixed support for oscillation on its axis, said member comprising a plurality of radially extending arms, the ends of said arms having pin means extending therefrom through openings in one of said annular peripheral portions of said reaction member and into said actuating ring to support the same between said peripheral portions and effect oscillation of the ring to actuate said brake shoes.

5. In a brake mechanism for a vehicle, the combination with a vehicle wheel and a fixed support for the wheel, of a brake drum carried on the wheel, a reaction member within said drum intermediate opposite sides thereof having axially spaced annular peripheral portions, means fixedly mounting said reaction member on said fixed support, said peripheral portions each having a plurality of peripherally spaced and axially aligned radially outwardly extending projections, adjacent peripherally spaced and axially aligned projections providing cooperating pairs, said cooperating pairs having peripherally facing reaction surfaces disposed angularly relatively on an outwardly increasing angle, an arcuately shaped brake shoe positioned between each of said cooperating pairs of projections with opposite ends of the shoe engaging facing reaction surfaces and opposite longitudinal edges of the shoes disposed axially beyond said spaced peripheral portions of said reaction member whereby said shoes overlay said reaction member, retraction spring means between each of said shoes and said reaction member normally retaining said shoes in engagement with cooperating facing reaction surfaces, an actuating ring positioned between said annular peripheral portions for oscillation on its axis and having a peripheral cam surface adjacent each of said brake shoes to effect radial movement of the shoe into engagement with said drum, anti-friction means disposed between each of said shoes and the cam surface thereadjacent on said actuating ring to effect transfer of cam movement to said shoes, and a manually actuated member carried on said fixed support for oscillation on its axis, said member comprising a plurality of radially extending arms, the ends of said arms having pin means extending therefrom through openings in one of said annular peripheral portions of said reaction member and into said actuating ring to support the same between said peripheral portions and effect oscillation of the ring to actuate said brake shoes, and a lash adjusting device between said pin and said opening in said annular peripheral portion comprising a U-shaped leaf spring positioned in said opening around said pin, said spring when positioned in the opening having the open end thereof slightly smaller than the diameter of the pin with the ends of the spring turned outwardly into engagement with opposite edges of the spring to prevent movement of the spring in the opening in one direction and provide for movement in the opposite direction, said pin having only limited longitudinal movement in the spring without effecting movement of the spring in said opposite direction.

6. A brake mechanism in accordance with claim 1 wherein the said reaction member comprises a pair of annular rings having axially spaced parallel outer annular peripheral portions and inner annular portions in face engagement to provide an annular chamber between the outer annular portions in which the said actuating ring is disposed.

References Cited in the file of this patent

UNITED STATES PATENTS

| | | |
|---|---|---|
| 1,575,426 | Harry | Mar. 2, 1926 |
| 1,699,539 | Leonard | Jan. 22, 1929 |
| 2,602,525 | Jurgens | July 8, 1952 |